Feb. 11, 1958 — E. H. BERGER — 2,822,644
PLANT PROTECTOR
Filed June 27, 1955

INVENTOR.
EDWARD H. BERGER
BY
Elton T. Barrett
ATTORNEY

United States Patent Office 2,822,644
Patented Feb. 11, 1958

2,822,644

PLANT PROTECTOR

Edward H. Berger, Hawthorne, N. Y.

Application June 27, 1955, Serial No. 518,197

1 Claim. (Cl. 47—32)

This invention relates to a plant protector for trapping and conserving moisture in the soil around the base of a plant.

The particular features and advantages of this invention will be apparent from the following description of a preferred embodiment of the invention considered with the accompanying drawings, in which.

Figure 1:
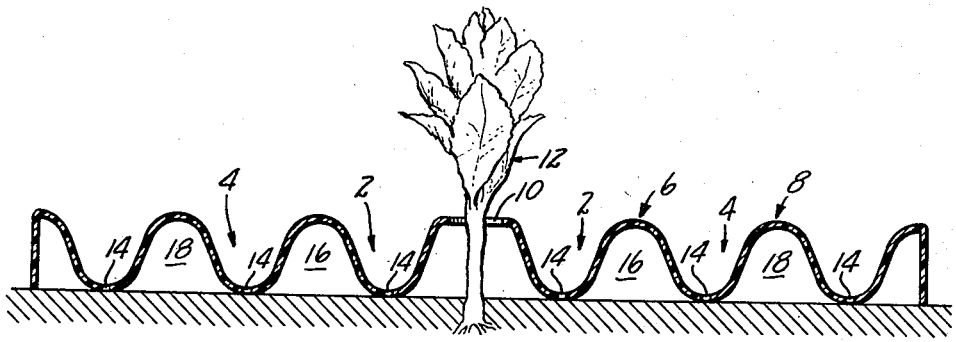
Figure 1 is a vertical sectional view showing the plant protector in position around a plant.

The plant protector is formed of bendable material, and preferably material which is resilient, so that upon deformation it returns to its natural shape. It may be formed, for example, of sheet material, plastic, impregnated paper products, or the like. In the particular example illustrated in the drawings, the device is formed from a circular plastic sheet formed to provide a series of annular convolutions so as to form concentric valleys, such as are indicated at 2 and 4, and intervening annular peaks such as are indicated at 6 and 8. In the center of this plastic sheet is a central opening 10 which surrounds the plant, such as the one indicated at 12, which is to be protected by the device. A series of holes 14 are provided in the bottom of each of the valleys 2 and 4 so that water caught by these valleys can drain into the soil around the plant.

It is an important feature of the invention that the bottom of each of these valleys 2 and 4 rests upon the surface of the soil so that the annular chambers, such as are indicated at 16 and 18 in Figure 1, are substantially isolated from each other. For example, if these valleys were not arranged so that they rest upon the surface of the soil, the entire area beneath the plant protector would be open and would permit excessive circulation of air beneath the plant protector and would permit the ready escape of water vapor through the openings 14. With the arrangement shown, the openings 14 do not permit the water vapor present in the annular chambers 16 and 18 to escape. This isolation of the chambers has been found to be important to the proper protection of the plant. In order to position the plant protector around the plant a radial slit 20 is provided between the central opening 10 and the outer edge of the plant protector. This slit permits the adjacent edges of the plastic material to be separated lateraly to form an opening sufficient to permit the device to be placed around the base of the plant which is to be protected.

Many earlier devices have been proposed for the protection of plants. Some of these have been formed of sheet material and some have had annular convolutions. None, however, has been commercially successful. There are a number of reasons for this, but the most important factors are undoubtedly cost and effectiveness. For example, a ground cover which permits circulation of air throughout its interior area cannot be made effective. First, such an arrangement permits excessive evaporation through openings in the covering material. Secondly, if it is made large enough to provide maximum protection, if permits internal connection currents to carry moisture from the center portion to the edge portions where the moisture supply has been depleted by weeds or by evaporation from the soil just outside the perimeter of the protector. The structure described above overcomes these disadvantages by the formation of a series of isolated annular chambers by a single structure that can be produced in large quantities at low cost.

Figure 2:
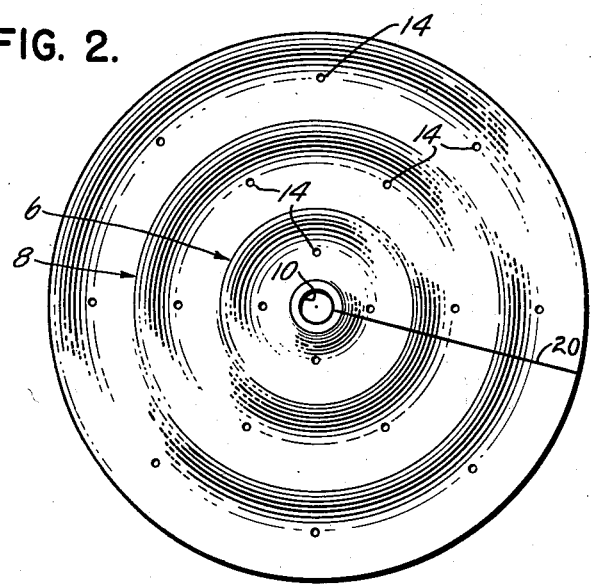
Figure 2 is a plan view of the plant protector.
Figure 3:
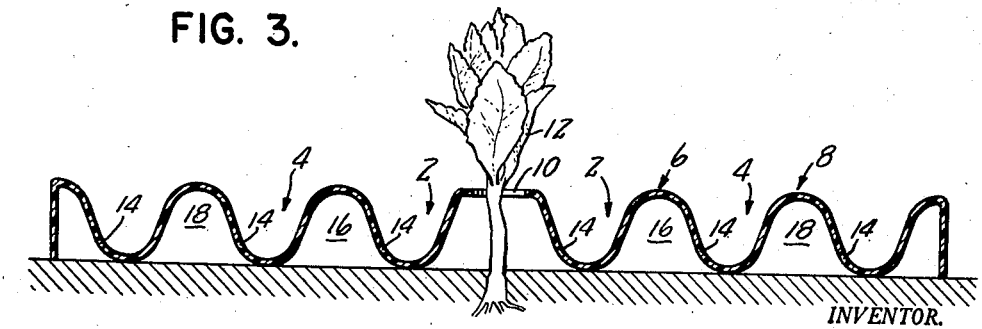
Figure 3 shows another embodiment of the plant protector.

In Figure 3 another plant protector is shown in which similar parts have been given the same numbers as those of Figures 1 and 2. In this device the openings 14 are not positioned at the bottom of the valleys but are positioned part way up the side walls in order to provide controlled evaporation of the water. This embodiment is intended for use in areas where a greater amount of moisture is present than in the embodiment shown in Figure 1. It will be noted, however, that the bottom of each of the valleys or troughs again is in contact with the surface of the soil so that the concentric chambers are isolated from each other.

It will be apparent that the size of the device will depend upon the size of the plant on which it is to be used. For example, for use with small plants the device may have a diameter of six inches and have only two or three concentric convolutions. With larger plants or with trees the device may have a diameter as much as three feet and may have as many as 20 concentric convolutions.

I claim:

An improved plant protector comprising a body of thin resilient water impervious material having an outer edge and a raised center zone at its top and concentric spaced rings formed in said body around said zone, each of said rings having sides sloping down from the top of said body and having bottom surfaces substantially beneath said top, said bottom surfaces lying generally in the same plane and being adapted to contact the ground on concentric circles around said center zone, said center zone having an opening through which a plant can grow, each of said rings adjacent their bottom surfaces having small water openings through them, said body having a radial cut through it extending from said center opening to its outer edge, said body being aligned edge-to-edge along said cut to seal it against the escape of moisture, the outer edge of said body being turned down in a generally circular rim, said outer edge terminating in the plane of said bottom surfaces.

References Cited in the file of this patent

UNITED STATES PATENTS 1,584,589     Adams _____ May 11, 1926

FOREIGN PATENTS 271,715     Germany _____ Mar. 17, 1914